UNITED STATES PATENT OFFICE.

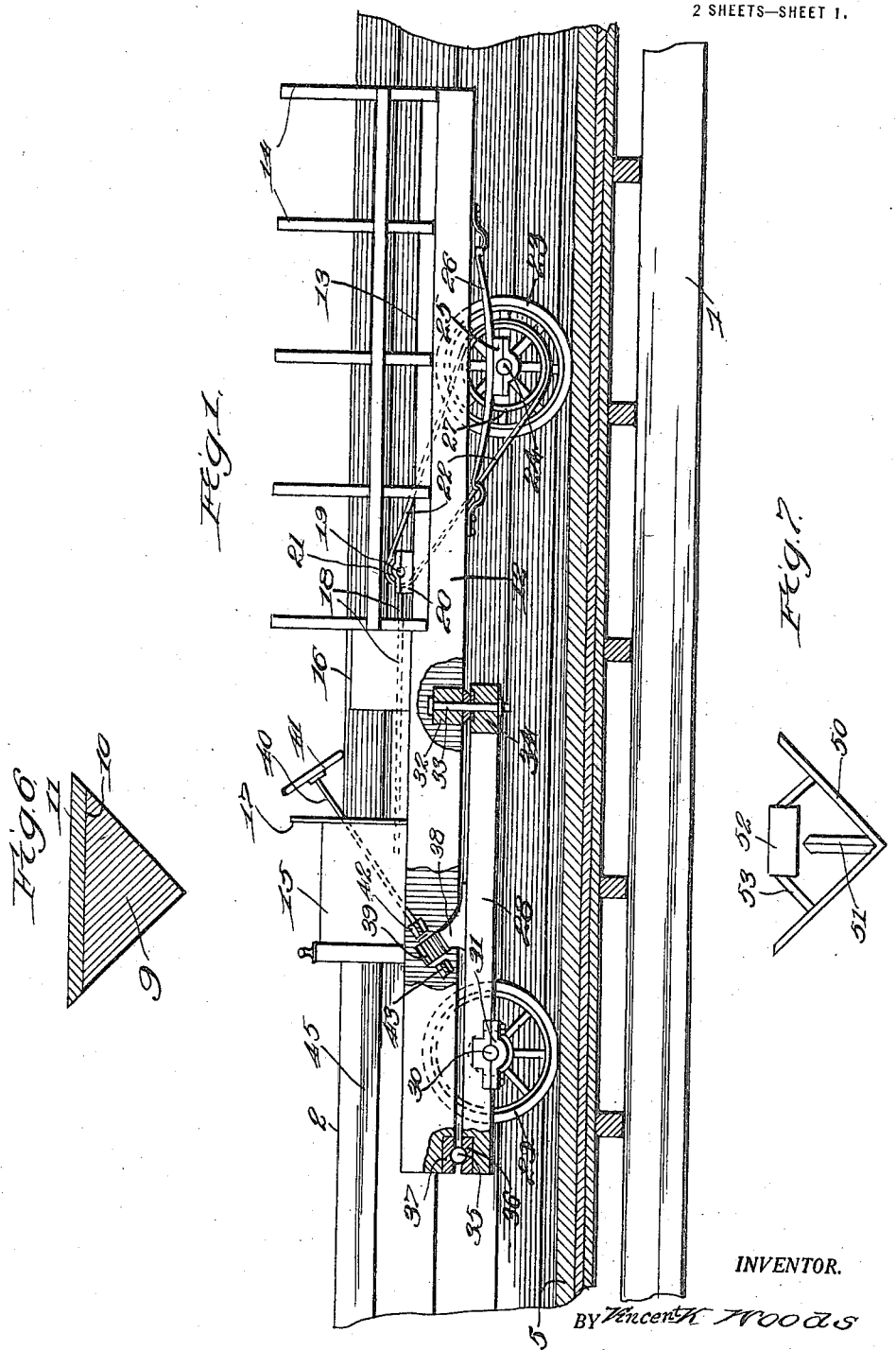

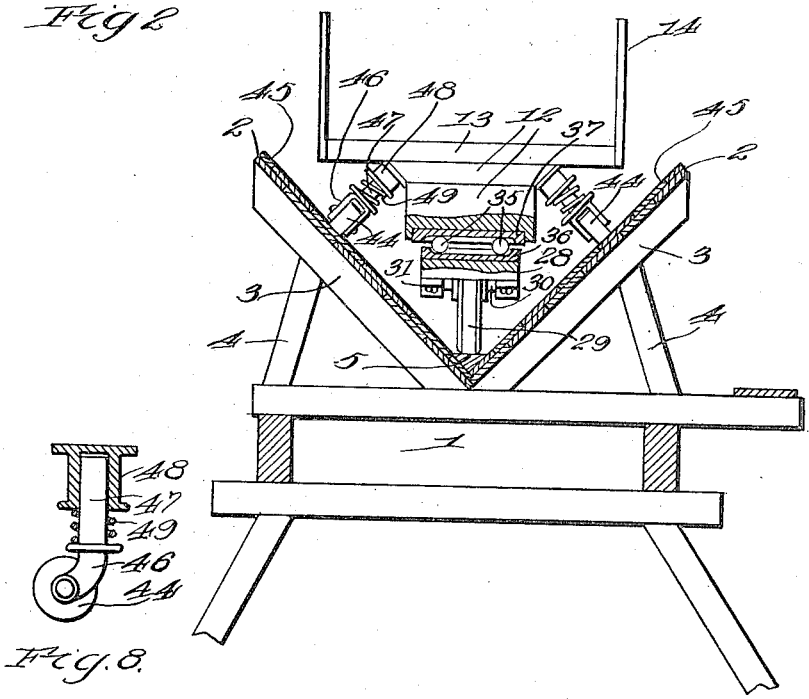
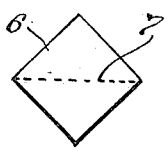
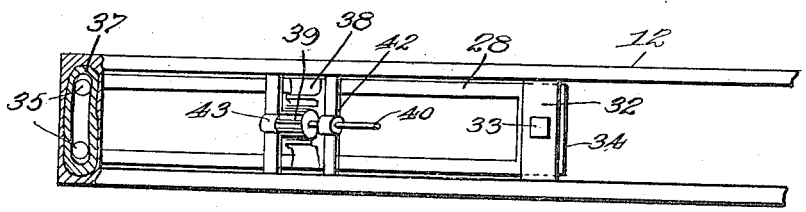

VINCENT K. WOODS, OF MARBLE CREEK, IDAHO.

FLUME CONSTRUCTION AND CAR THEREFOR.

1,280,352.  Specification of Letters Patent.  Patented Oct. 1, 1918.

Application filed May 23, 1918. Serial No. 236,253.

*To all whom it may concern:*

Be it known that I, VINCENT K. WOODS, a citizen of the United States, residing at Marble Creek, county of Shoshone, and State of Idaho, have invented new and useful Improvements in Flume Construction and Cars Therefor, of which the following is a specification.

This invention relates to improvements in transportation mechanism.

More particularly speaking, the object of this invention is to provide a carrier or car adapted to operate in a flume when the latter is not being used to convey logs or lumber. Lumber and logging flumes have heretofore been exclusively utilized in the transportation of material by the current of water flowing in the flume. In fact, the great majority of flumes are constructed from relatively inaccessible points of production toward points of disposition or transport because of the lack of roads, railways and other means of transportation. Therefore, it is usually a source of great expense and considerable labor to convey the necessary supplies and materials to such relatively remote points of production.

Now it is the primary object of this invention to enlarge the function of a flume so that the latter may serve as a track upon which a car may be advanced to carry supplies, when the flume is not in operation, so that the flume will not only perform its usual function, as such, but an additional function as a track-way.

It is well known that flumes have a V shaped cross-section and therefore it is an object of this invention to provide a car which is so constructed that it may be advanced in and along the flume without the necessity of providing the same with special trackage.

In order to permit the car to negotiate curves, my improved car comprises a main car frame and a preferably forward truck, the said truck having a king-bolt pivotal connection with the main frame at a considerable distance rearwardly from the front of said main frame whereby steering movement imparted to the truck will responsively act upon the frame to enable the car to safely round a curve.

My improved car is provided with supporting wheels adapted to track in the bottom of the flume to support the car, and I also provide stabilizing wheels running against the inside faces of the flume walls to maintain the car in an upright position. It is a special feature of my invention to mount stabilizing wheels upon the frame of the car so that these wheels themselves will tend to maintain the car in position in the flume, the steering feature being primarily for the purpose of canting the car when it is rounding a curve to overcome centrifugal force.

While my invention broadly contemplates the idea of providing a flume car for running in a flume, irrespective of the construction of the latter, still, my invention also resides in and comprises a special form or forms of flumes which greatly facilitate the utility of my improved car in connection therewith.

My invention has other objects and features which will be more fully described in connection with the accompanying drawings, and which will be more particularly pointed out in and by the appended claims.

In the drawings:

Figure 1, is a longitudinal vertical sectional view of a flume showing one form of my improved car therein, the car being shown in side elevation, with parts in sections.

Fig. 2, is a transverse sectional view of the flume looking toward the front of the car.

Fig. 3, is a plan view of the front portion of the main frame and illustrating the relation of the steering truck therewith.

Fig. 4, is an end view of a timber showing the dotted line cut to form the filler illustrated in Fig. 5.

Fig. 6, is a sectional view of another form of filler.

Fig. 7 is a diagrammatic cross-sectional view of one of the usual types of flume, showing the application of my invention thereto.

Fig. 8 is a sectional view of one of the caster stabilizing wheels, and its mounting.

Like characters of reference designate similar parts throughout the different figures of the drawings.

As illustrated, 1 designates, as a whole, a conventional form of flume supporting structure which I will not describe in detail because it does not form any essential feature of my invention. The flume proper comprises the side walls 2, which may be formed of double or single planking suitably supported at 3 and 4. In the improved flume shown, a wood filler 5 forms a flat track bottom to what would otherwise be, in cross-section, the inverted apex or terminal point of convergence of the V-shaped side walls 2. On light grades, this filler is made by splitting a timber 6, on the dotted line 7, so that the flat horizontal track surface 8, on which the car wheels run, will have its grain disposed lengthwise, or in other words, in the path of travel of the car. On steep grades, where I desire to get extra tractive surface, the filler 9, as shown in Fig. 6, will be somewhat reduced, as indicated at 10. The reduced portion will be filled in with short length and transversely disposed boards 11 with the grain running transversely of the filler. Thus the car wheels on the steep portions will operate transversely of the grain, and this will afford added traction. In cases where the filler or the boards are of hard wood, a chain applied to the car wheels will soon give or impart to the surface a sufficient broken face to afford the desired traction. These are features of my invention which it will be found to be of great advantage in building a new flume adapted to function in the capacity for which my invention is designed. However, I do not wish to be limited to the application of a car to a specially constructed flume, as I consider it broadly new to employ a car in a flume with the latter functioning as trackage for the former.

Referring now to my novel car, the same comprises a main frame 12, which will preferably have a suitable truck bed 13 for the disposition of material to be carried, stakes 14 serving to hold the load in place. This frame 12 will desirably be co-extensive in length with respect to the length of the car. At this point, I desire to develop the fact that while my invention broadly consists in applying the car to a flume, I prefer in practice to provide a self-propelled car. Therefore, the frame is provided with a motor hood 15 in which any suitable form of motor may be disposed, 16 indicating the driver's seat and 17 the dash. A drive shaft 18 extends rearwardly and may be geared or otherwise drivingly connected with a sprocket shaft 19, mounted in suitable bearings 20, on the frame 12. A sprocket wheel 21 may be mounted upon said shaft and a sprocket chain 22 is trained over said wheel. My improved car or truck is essentially of the mono-rail type and a rear supporting wheel 23 is also utilized as a drive wheel. The axle 24 is shown journaled in bearings 25 which may be spring suspended below the truck frame 12 by springs 26. A sprocket wheel 27 rigidly mounted upon the axle 24 takes the drive from chain 22. I do not wish to be limited to the particular form of detail drive shown, as this is a matter capable of wide latitude.

The forward end of the frame 12 is supported upon a truck 28. A steering and supporting wheel 29 is mounted upon an axle 30, the latter being journaled in suitable bearings 31, secured to truck 28. It will be seen that truck 28 extends from the front end of the main frame 12 approximately midway of the length of the latter, the exact length of the truck frame being immaterial. However, it is a feature of my invention to dispose the steering axis of the truck frame 28 considerably in the rear of the front of the main frame 12. Thus, the main frame 12 may have a cross-brace 32, through which a king-bolt 33 extends. The truck frame 28 is provided at its rear end with a transverse connecting timber 34 down through which the king-bolt 33 extends to pivotally unite the truck frame with the main frame. It will be seen by reference to Fig. 3 that both the truck and main frames are relatively elongated rectangular frames. From the foregoing construction, it will be seen that the forward end of the truck frame will have lateral movement relative to the forward end of the main frame, and in order to minimize friction therebetween, I interpose anti-friction balls 35 which may operate in suitable ball races 36 and 37, mounted respectively in truck frame 28 and main frame 12. These races will be arcuate and will be struck from a radius of which the axis of the king-bolt is the center.

Means is provided for steering the car, and I have herein shown such means of a very simple form since the means itself is not so important as the combination thereof with my improved car, the essential thing being that the steering means laterally shifts the truck frame 28 with respect to the main frame 12, about the king-bolt 33 as an axis. As illustrated, a rack 38 may be mounted on the truck frame 28, and the same may project upwardly into the main frame 12. The rack is very short in length because of the very slight movement which it will be necessary to impart to the frame 28. A pinion 39 is mounted upon a steering post 40 having a steering wheel 41. Bearings 42 and 43, mounted upon frame 12, provide means for journaling the steering post 40. Now it will be obvious that as the steering wheel 40 is turned in one direction the car will be guided in a direction opposite to the direction in which the steering wheel has been turned. This is true assuming that the frame 12 is stabilized against lateral movement, which it is, as I will now describe.

Extending from opposite sides of the frame 12, are stabilizing wheels 44 which traverse the inside faces 45 of the flume walls 2. Wheels 44 are mounted in yokes 46, the shanks 47 of which telescope and are swiveled in sockets 48, mounted on frame 12. Thus these stabilizing wheels function as caster wheels and I consider it a part of my invention to employ caster wheels to stabilize the car frame 12. Springs 49 urge the yokes 46 downwardly and outwardly against the flume walls 2, thereby stabilizing the car and maintaining the same in an upright position. These stabilizing wheels will preferably be disposed in pairs, one pair being forwardly of the king bolt 33 and the other pair being rearwardly of said bolt.

Thus in rounding a curve when the car is tilted by means of the steering device, the stabilizing wheels radially outwardly will track up the flume side 2 while the wheels radially inwardly will track down the flume side. If these stabilizing wheels were not swiveled or caster wheels, they would skid instead of rolling, when the car is tilted, and further, they would have to be absolutely true, if rigid in their sockets, in order to act in unison and in harmony with the car and flume, it being understood that a great deal of lee-way is required in such a rough structure. It will also be clear that these stabilizing wheels not only function to maintain the car in an upright position, but, in the absence of any steering means, these stabilizing wheels might, roughly speaking, act to guide the car throughout its travel in the flume, not only in straight stretches but through curved courses. However, such a construction would involve the assumption of a front wheel incapable of steering movement or adjustment, and therefore, the stabilizing wheels would necessarily cause slippage or lateral skidding of the supoprting wheels in maintaining the car upright and in negotiating curves. Furthermore, in the absence of a steering device, it would be impossible to cant or tilt the car toward the radial center of the curve it was rounding. Hence, the importance of the steering truck frame 28, which enables the operator to guide the car in the flume not only through curved portions but also on straight stretches.

In Fig. 7, I have illustrated, diagrammatically, at 50, a V-shaped flume of simple form with a supporting car wheel 51 having a periphery shaped to run in the apex of the line of convergence of the flume. 52 is the car, and 53 designates means for stabilizing the car in the flume.

An important feature of my invention is that it is not necessary to obstruct the interior of the flame in any manner whatsoever, in order to operate my improved car therein. Wholly apart from the excess cost of laying rails along the sides of the flume, is the more important fact that such parts would obstruct the passage through the flume of lumber and logs. Further, by employing caster wheels running on the inside faces of the flume, it is not necessary to make the same as accurate as would be necessary if the wheels run on the upper edges of the flume walls.

It is believed that my invention, which resides in the car, the flume, and the combination, will be clearly understood from the foregoing description, and while I have herein shown specific forms of my invention, I do not wish to be limited thereto except for such limitations as the claims may import.

I claim:—

1. In combination, a water carrying flume structure, and a car having means engaging said structure to maintain the car upright as the car advances in and along said flume structure when water is not running therethrough, whereby said flume can be alternately used to water convey material in one direction and car convey material in either direction.

2. In combination, a water carrying flume structure, and a car having supporting wheels engaging the bottom of said structure and stabilizing wheels engaging the sides of said structure to maintain the car upright as the car advances along said flume structure when water is not running therethrough, whereby said flume can be alternately used to water convey material in one direction and car convey material in either direction.

3. In combination, a V-shaped flume, and a car having vertically disposed supporting wheels engaging the bottom of said flume to support the car and said car having inclined wheels engaging the sides of said flume to maintain the car upright as it advances along the flume.

4. In combination, a V-shaped water-carrying flume, and a car having supporting wheels engaging said flume to support the car and said car having stabilizing wheels engaging said flume to maintain the car upright as it advances along said flume, when the water is not running therethrough whereby the flume can be alternately used to water-convey material in one direction and car-convey material in either direction.

5. A car adapted to be propelled in a flume, comprising in combination, a main frame, a supporting wheel for said frame, means on said main frame for rotating said wheel to advance said car, a steering frame under said main frame, a king bolt pivotally uniting said steering frame with said main frame, at a point rearwardly of the front of said main frame, a wheel mounted on and supporting said steering frame in advance of said king bolt, stabilizing wheels on said main frame in the rear of and in advance of said king bolt for engagement with said flume to hold the main frame upright in said flume, and means on said main frame for adjusting said steering frame to steer said car.

6. In combination, a V-shaped flume, a car for said flume comprising a main frame, a supporting wheel for said main frame, means on said main frame for rotating said wheel to advance said car, a steering frame under said main frame, a king bolt pivotally uniting said steering frame to said main frame at a point rearwardly of the front of said main frame, a wheel mounted on and supporting said steering frame in advance of said king bolt, stabilizing wheels on said main frame in the rear of and in advance of said king bolt for engagement with the sides of said flume to hold said main frame upright in said flume, and means on said main frame for adjusting said steering frame to steer said car.

7. A flume car comprising in combination, a main car frame, a supporting wheel therefor adapted to run in the bottom of the flume, a steering frame or truck for said car pivoted to said main frame, a steering and supporting wheel on said truck, and means for shifting said truck to steer said car.

8. A flume car comprising in combination, a main car frame, a supporting wheel therefor adapted to run in the bottom of the flume, a steering truck pivoted to said main frame and having a supporting wheel adapted to run in the bottom of said flume, means for adjusting said truck to steer the car, and caster wheels on the main frame fore and aft of the pivotal connection of the truck with the main frame for engagement with the sides of the flume to maintain the car upright in the flume.

9. A flume car comprising in combination, a main frame, a supporting wheel for one end portion of said frame, a steering frame beneath and pivoted to said main frame and engaging and supporting the remaining end portion of said main frame, and a supporting wheel for said steering frame, substantially as described.

10. A flume car comprising in combination, movably united main and steering truck frames together forming a car frame, a supporting wheel for each of said frames, and stabilizing wheels on said main frame, substantially as described.

11. A flume car comprising in combination, pivotally united main and steering truck frames together forming a car frame, a supporting wheel for each of said frames, and caster stabilizing wheels for one of said frames, substantially as described.

12. In combination, a V-shaped flume, and a car comprising pivotally united main and steering frames, a wheel for each of said frames adapted to support the car by engagement with the bottom of said flume, and stabilizing wheels on said car engaging the sides of said flume to maintain the car upright as it advances along said flume, substantially as described.

13. In combination, a flume having a bottom and sides, a car comprising pivotally united main and truck frames, wheels for said frames engaging the bottom of said flume, stabilizing wheels engaging the sides of said flume to hold the car upright as the latter advances along said flume, and means on said main frame for shifting said steering frame to steer the car, substantially as described.

14. In combination, a water-carrying flume structure, and a motor-propelled car having means engaging said structure to maintain the same upright as the car advances in and along said structure when the water is not running therethrough, whereby said flume can be alternately used to water convey material in one direction and car convey material in either direction, substantially as described.

In testimony that I claim the foregoing as my own, I hereby affix my signature.

VINCENT K. WOODS.

Copies of this patent may be obtained for five cents each, by addressing the "Commissioner of Patents, Washington, D. C."